US009681332B2

(12) United States Patent
Min et al.

(10) Patent No.: US 9,681,332 B2
(45) Date of Patent: Jun. 13, 2017

(54) COMPRESSION CONFIGURATION IDENTIFICATION

(71) Applicant: INTEL CORPORATION, Santa Clara, CA (US)

(72) Inventors: Alexander W. Min, Portland, OR (US); Guan-Yu Lin, Caotun Township (TW); Tsung-Yuan C. Tai, Portland, OR (US); JR-Shian James Tsai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 14/316,653

(22) Filed: Jun. 26, 2014

(65) Prior Publication Data

US 2015/0382235 A1 Dec. 31, 2015

(51) Int. Cl.
*H04W 28/06* (2009.01)
*H04W 52/02* (2009.01)
*H04L 12/707* (2013.01)
*H04L 12/751* (2013.01)
*H04L 12/721* (2013.01)
*H04L 12/12* (2006.01)
*H04L 12/26* (2006.01)

(52) U.S. Cl.
CPC ............ *H04W 28/06* (2013.01); *H04L 45/02* (2013.01); *H04L 45/22* (2013.01); *H04L 45/26* (2013.01); *H04L 45/32* (2013.01); *H04W 52/0209* (2013.01); *H04W 52/0251* (2013.01); *H04L 12/12* (2013.01); *H04L 43/08* (2013.01)

(58) Field of Classification Search
CPC ......... H04L 45/02; H04L 45/32; H04L 45/26; H04L 45/22

USPC .......................................................... 370/230
See application file for complete search history.

(56) References Cited

U.S. PATENT DOCUMENTS 5,623,935 A 4/1997 Faisandier
8,305,947 B2 11/2012 Wang et al.
(Continued)

FOREIGN PATENT DOCUMENTS

EP 2237561 A2 10/2010
WO WO 01-63772 A1 8/2001

OTHER PUBLICATIONS

Extended European Search Report mailed Nov. 5, 2015 for European Application No. 15167651.7, 8 pages.
(Continued)

*Primary Examiner* — Jae Y Lee
*Assistant Examiner* — Jean F Voltaire
(74) *Attorney, Agent, or Firm* — Schwabe, Williamson & Wyatt, P.C.

(57) ABSTRACT

Apparatuses, methods and storage media associated with file compression and transmission, or file reception and decompression. Specifically, one or more compression/decompression or transmission/reception parameters associated with transmission or reception may be identified. Based on the identified parameters, energy consumption of compression and transmission, or reception and decompression, of the data over a wireless communication link may be predicted. Based on that prediction, a compression configuration may be identified. Other embodiments may be described and/or claimed.

20 Claims, 14 Drawing Sheets

(56) References Cited

U.S. PATENT DOCUMENTS

| | | | |
|---|---|---|---|
| 2003/0064744 A1* | 4/2003 | Zhang | H04W 52/20 455/522 |
| 2003/0198294 A1* | 10/2003 | Zaccarin | H04N 19/119 375/240.16 |
| 2005/0080872 A1 | 4/2005 | Davis et al. | |
| 2008/0310443 A1* | 12/2008 | Gage | H04L 45/02 370/431 |
| 2009/0046775 A1 | 2/2009 | Thiagarajan et al. | |
| 2010/0254621 A1 | 10/2010 | Wennersten et al. | |
| 2011/0055360 A1 | 3/2011 | Jones et al. | |
| 2011/0199948 A1 | 8/2011 | Wang et al. | |
| 2011/0299412 A1* | 12/2011 | Diab | H04L 12/12 370/252 |
| 2013/0036101 A1 | 2/2013 | Marwah et al. | |
| 2013/0301430 A1 | 11/2013 | Pamu et al. | |
| 2013/0336380 A1 | 12/2013 | Mese et al. | |
| 2014/0376405 A1* | 12/2014 | Erickson | H04W 52/0212 370/254 |

OTHER PUBLICATIONS

International Search Report and Written Opinion mailed Aug. 31, 2015 for International Application No. PCT/US2015/032273, 11 pages.

International Search Report and Written Opinion mailed Jul. 8, 2016 for International Application No. PCT/US2016/027532, 13 pages.

\* cited by examiner

Non-transitory computer-readable storage medium 1402

Programming Instructions 1404
Configured to cause a device, in response to execution of the programming instructions, to practice (aspects of) embodiments of the process of Figures 4-8 or 12.

Figure 14

COMPRESSION CONFIGURATION IDENTIFICATION

TECHNICAL FIELD

The present disclosure relates to the field of data processing and data communication and, in particular, to the identification of a compression configuration for transmission of data in a wireless network.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Due to the increasing popularity of various mobile applications and services, the amount of mobile data traffic is expected to significantly increase in the near future. Therefore, energy-efficient design of communication subsystems may become more important to increase the overall platform energy efficiency for mobile workloads (e.g., file transfer and video streaming). This energy-efficient design may be increasingly important for small form factor mobile platforms, such as smartphones and tablets.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 14 illustrates a storage medium having instructions for practicing methods described with references to FIG. 4-7 or 12, according to disclosed embodiments.

DETAILED DESCRIPTION

Figure 1:
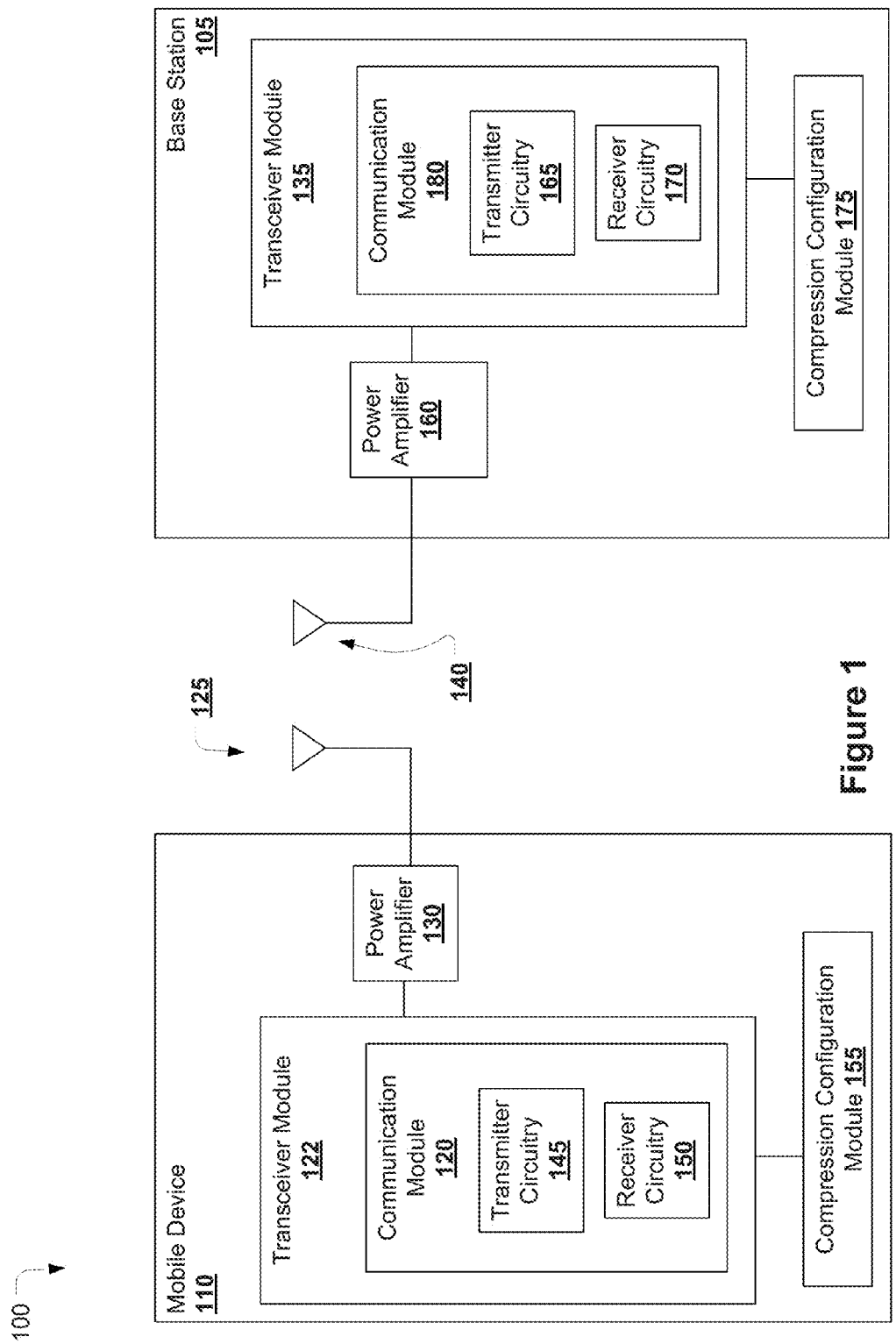
FIG. 1 illustrates a simplified block diagram of a wireless network, according to various embodiments.

Disclosed embodiments include apparatuses, methods and storage media associated with file compression and transmission, or file reception and decompression. Specifically, one or more compression/decompression or transmission/reception parameters associated with transmission or reception may be identified. Based on the identified parameters, energy consumption of compression and transmission, or reception and decompression, of the data over a wireless communication link may be predicted. Based on that prediction, a compression configuration that reduces or minimizes the energy consumption of a mobile device may be identified.

In some embodiments, compression/decompression related parameters may include file size, file type (e.g., TXT, CSV, or TAR), applied compression utilities (e.g., GZIP, LZOP, or BZIP2), operating systems (e.g., Android®, iOS®, or Windows®), and/or device capabilities including operating central processing unit (CPU) frequency, to name a few. Additionally, transmission/reception related parameters may include the type of wireless technologies used (e.g., Wi-Fi, 3G, 4G), available transmission bandwidth, signal to interference plus noise ratio (SINR), modulation encoding scheme (MCS) of the physical settings, the number of competitors for wireless resources, or one or more other transmission related parameters.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 schematically illustrates a wireless communication network 100 (hereinafter "network 100") in accordance with various embodiments. The network 100 may include a mobile device 110 coupled with a base station 105. In some embodiments, the network 100 may be an access network of a third generation partnership project (3GPP) long term evolution (LTE) network such as evolved universal terrestrial radio access network (E-UTRAN). In these embodiments the base station 105 may be an eNodeB (eNB, also referred to as an evolved NodeB) configured to wirelessly communicate with the mobile device 110 using a wireless protocol such as the 3GPP LTE wireless protocol. In other embodiments the network 100 may be a network such as a WiMAX network as specified by the Institute of Electrical and Electronics Engineers (IEEE) 802.16 wireless standards, a Wi-Fi network as specified by the IEEE 802.11 standards, a 3GPP code division multiple access (CDMA) or wideband CDMA (W-CDMA) network, a 3GPP Universal Mobile Telecommunications System (UMTS) network, or some other type of wireless network comprising a mobile device and an access point or base station.

As shown in FIG. 1, the mobile device 110 may include a transceiver module 122, which may also be referred to as a multi-mode transceiver chip. The transceiver module 122 may be configured to transmit and receive wireless signals. Specifically, the transceiver module 122 may be coupled with one or more of a plurality of antennas 125 of the mobile device 110 for communicating wirelessly with other components of the network 100, e.g., base station 105 or another mobile device. The antennas 125 may be powered by a power amplifier 130 which may be a component of the transceiver module 122, or coupled with the transceiver module 122 and generally between the transceiver module 122 and the antennas 125 as shown in FIG. 1. In one embodiment, the power amplifier 130 may provide the power for all transmissions on the antennas 125. In other embodiments, there may be multiple power amplifiers on the mobile device 110. The use of multiple antennas 125 may allow for the mobile device 110 to use transmit diversity techniques such as spatial orthogonal resource transmit diversity (SORTD), multiple-input multiple-output (MIMO), or full-dimension MIMO (FD-MIMO).

In certain embodiments the transceiver module 122 may include a communication module 120, which may be referred to as a broadband module. Communication module 120 may contain both transmitter circuitry 145 configured to cause the antennas 125 to transmit one or more signals from the mobile device 110, and receiver circuitry 150 configured to cause the antennas 125 to receive one or more signals at the mobile device 110. In other embodiments, the communication module 120 may be implemented in separate chips or modules, for example, one chip including the receiver circuitry 150 and another chip including the transmitter circuitry 145. In some embodiments the signals may be cellular signals transmitted to or received from a base station such as base station 105. In some embodiments, the transceiver module 122 may include or be coupled with a compression configuration module 155 configured to identify one or more compression configurations for the data transmitted by antennas 125, and either compress the data prior to transmission or decompress the data subsequent to reception of the data by the antennas 125. Having an optimally selected compression may significantly reduce energy consumption on mobile platforms. These and other aspects of the present disclosure will be further described in more detail below.

Similarly to the mobile device 110, the base station 105 may include a transceiver module 135. The transceiver module 135 may be further coupled with one or more of a plurality of antennas 140 of the base station 105 for communicating wirelessly with other components of the network 100, e.g., mobile device 110. The antennas 140 may be powered by a power amplifier 160 which may be a component of the transceiver module 135, or may be a separate component of the base station 105 generally positioned between the transceiver module 135 and the antennas 140 as shown in FIG. 1. In one embodiment, the power amplifier 160 may provide the power for all transmissions on the antennas 140. In other embodiments, there may be multiple power amplifiers on the base station 105. The use of multiple antennas 140 may allow for the base station 105 to use transmit diversity techniques such as SORTD, MIMO, or FD-MIMO. In certain embodiments the transceiver module 135 may contain both transmitter circuitry 165 configured to cause the antennas 140 to transmit one or more signals from the base station 105, and receiver circuitry 170 configured to cause the antennas 140 to receive one or more signals at the base station 105. In other embodiments, the transceiver module 135 may be replaced by transmitter circuitry 165 and receiver circuitry 170 which are separate from one another (not shown). In some embodiments, though not shown, the transceiver module 135 may include a communication module such as communication module 180 that includes the receiver circuitry 170 and the transmitter circuitry 165. Similarly to mobile device 110, base station 105 may include a compression configuration module 175 configured to identify one or more compression configurations for the data transmitted by antennas 140, and either compress the data prior to transmission or decompress the data subsequent to reception of the data by the antennas 140. As described earlier, having an optimally selected compression may significantly reduce energy consumption on mobile platforms. These and other aspects of the present disclosure will be, as described in further detail below.

Figure 2:
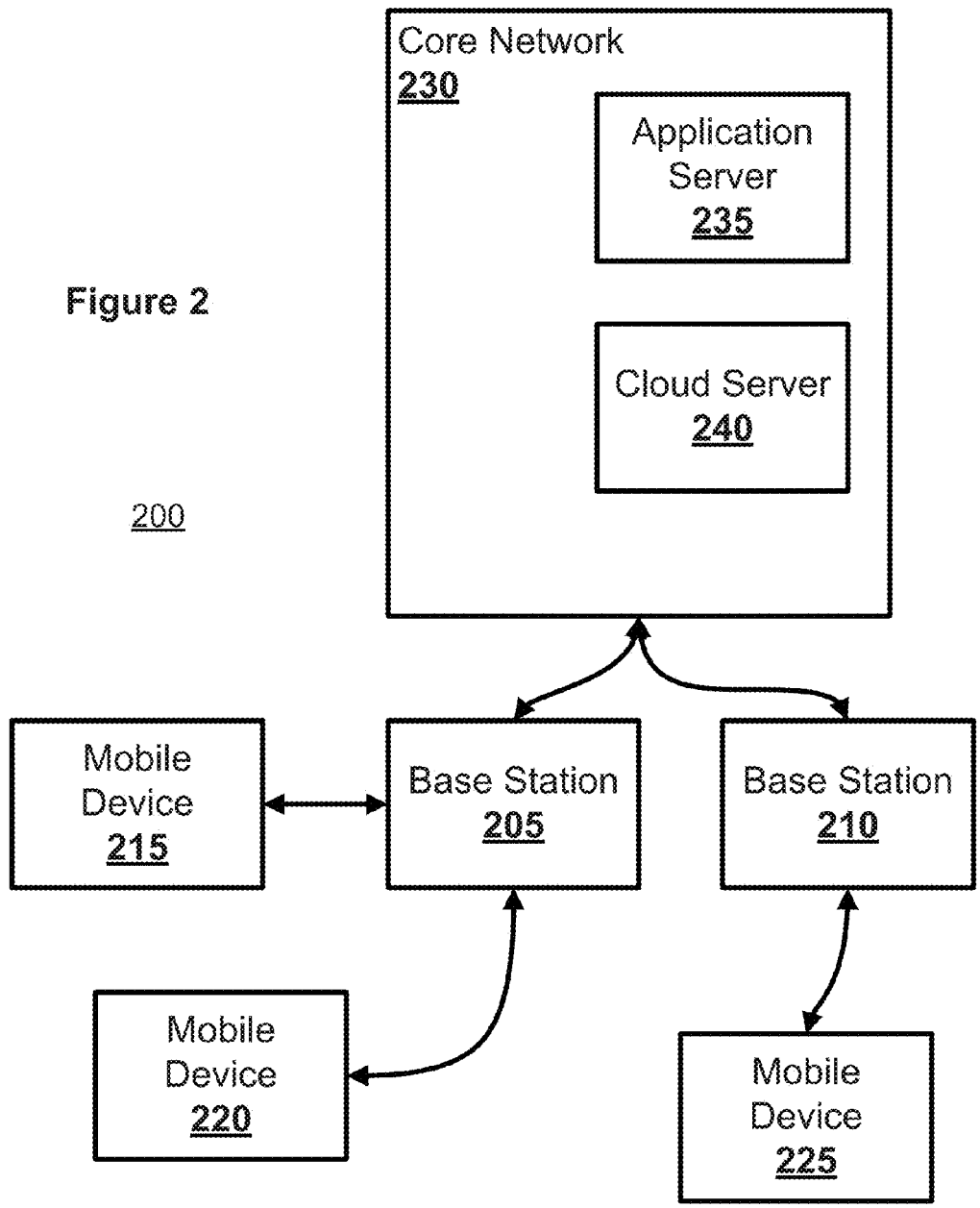
FIG. 2 illustrates a high-level block diagram of a wireless network, according to various embodiments.

FIG. 2 depicts an example of a network 200, which may be similar to network 100. Specifically, network 200 may include one or more base stations such a base stations 205 or 210, which may be similar to base station 105 of FIG. 1. The wireless network 200 may additionally include one or more mobile devices such as mobile devices 215, 220, or 225 that may be similar to mobile device 110 of FIG. 1. As shown in FIG. 2, a base station may only be coupled to a single mobile device, for example, base station 210 and mobile device 225; or a base station may be coupled to a plurality of mobile devices such as mobile devices 215 and 220 shown coupled to base station 205.

The base stations 205 and 210 may be coupled with a core network 230 comprising a plurality of servers such as application server 235, and a cloud server 240. For example, the base stations 205 and 210 may be configured to pass signals between a mobile device and one of the servers of the core network 230. An application server such as application server 235 may be a server that is dedicated to execution of procedures such as programs, routines, scripts, or some other procedure that is used for supporting one or more applied applications. A cloud server such as cloud server 240 may be a server that allows for and alters communications between a base station or mobile device and one or more other servers that are elements of core network 230. For example, the cloud server 240 may be responsible for identifying a compression configuration, and/or compressing or decompressing data using the compression configuration. In some embodiments, cloud server 240 and application server 235 may be implemented on the same piece of hardware. In other embodiments the application server 235 and the cloud server 240 may be implemented on separate pieces of equipment. In some embodiments, the two servers may be geographically co-located, while in other embodiments the servers may be located in different geographical areas. In other embodiments, the cloud server 240 may not be an element of the core network 230, but instead may be implemented on or coupled with a base station such as base stations 205 or 210, or a mobile device such as mobile devices 215, 220, or 225.

As noted above, in some embodiments correct selection and application of the data compression configuration may significantly reduce energy consumption of mobile platforms. For example, the data compression configuration may be based on the file type of the data, the file size of the data, available network bandwidth of the network 200, or one or more other parameters. In some embodiments, it may be useful to adaptively compress (either at the server or at the mobile device) mobile data using a compression configuration (for example, a compression utility or a compression level) on the fly. This compression may minimize the total mobile platform energy consumption not only for downlink (that is, transmission and compression of the mobile data by the server, and corresponding reception and decompression of the mobile data by the mobile device) scenarios, but also uplink (that is, transmission and compression of the mobile data by the mobile device, and corresponding reception and decompression of the mobile data by the base station or network) scenarios.

In many legacy networks, existing compression approaches use a fixed compression configuration that is not adapted to a given environment. In other words, the same compression type, compression level, or some other element of the compression configuration may be used without regard as to network bandwidth, file type, or file size.

Figure 3:
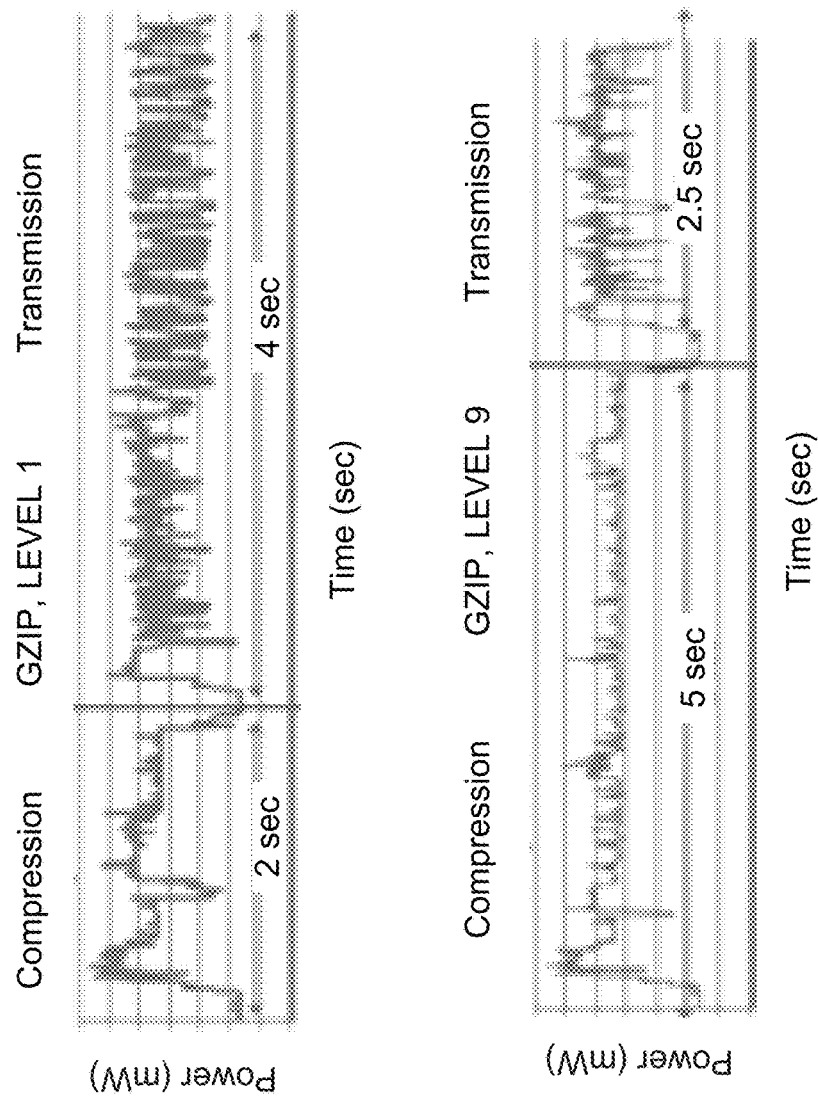
FIG. 3 illustrates an example of compression and transmission of data using different compression levels, according to various embodiments.

By contrast, embodiments herein may exploit the energy consumption trade-off between data compression/decompression and data communication such as transmission/reception to reduce or minimize the energy consumption of mobile platforms. An example energy consumption trade-off between compression and data transmission may be seen in FIG. 3 which depicts an example of compression of data on a mobile device and then transmission of the compressed data to a local server using a Wi-Fi interface. Specifically, FIG. 3 depicts the power (in milliwatts (mW)) and time (in seconds) for compression and transmission using different compression levels. For example, using GZIP with level 1 compression, compression of the mobile data may take approximately two seconds, while transmission of the mobile data may take approximately four seconds. By contrast, using GZIP level 9 compression, compression of the mobile data may take approximately five seconds, while transmission of the mobile data may take approximately 2.5 seconds. In this embodiment, and as generally described herein, a higher compression level may result in a longer time to compress a file, but may compress the file further. In other words, the higher the compression level applied to a file, the smaller the resultant compressed file may generally be.

As a result, it can be seen from FIG. 3 that when a higher compression level is applied, the mobile device may consume more energy for compression, but take less time and therefore consume less energy for transmission of the compressed data. This is because when a higher compression level is applied to data, the data can be compressed into a smaller file size, and thereby save the total energy required for data transmission over a wireless interface.

Therefore, it can be seen from FIG. 3 that there may exist an energy trade-off between compression and transmission. A similar energy trade-off may exist between reception and decompression. Additionally, it may be seen that there may be an optimal compression level to minimize or otherwise reduce the total platform energy consumption, i.e., the total compression energy plus the total transmission energy. Other than compression utility and compression level, there may exist one or more other factors that may affect the energy efficiency of compression and transmission, such as available network bandwidth, file type, file size, CPU frequency, etc., indicating that the platform energy consumption for mobile workloads may be minimized if the right compression configuration is used. Therefore, a compression configuration as used herein may include an indication of one or more of: the compression level, compression utility, and/or one or more of the other factors described above. As used herein, an optimal compression configuration may be considered to be a compression configuration that minimizes or otherwise reduces time and/or energy of file compression/decompression or file transmission/reception.

As mentioned above, the energy consumption/efficiency of compression (or decompression) and transmission (or reception) may be determined by one or more parameters. Compression related parameters may include file size, file type (e.g., TXT, CSV, or TAR), applied compression utilities (e.g., GZIP, LZOP, or BZIP2), operating systems (e.g., Android®, iOS®, or Windows®), and/or device capabilities including operating CPU frequency, to name a few. Transmission related parameters may include the type of wireless technologies used (e.g., Wi-Fi, 3G, 4G), available transmission bandwidth, SINR, MCS, the number of competitors for wireless resources, or one or more other transmission related parameters. In some embodiments, one or more of the compression related parameters or transmission related parameters may be considered a time-varying parameter.

In addition, the direction of the data flow (e.g. uplink or downlink) may matter, because it may take much more power for a mobile device to compress and transmit an uncompressed file than to receive and decompress a compressed file. When a mobile device such as mobile device 110 sends a file to a base station 105, cloud server 240, application server 235, or some other element of the network 200 or core network 230, the mobile device 110 may perform compression using an optimal compression configuration that may reduce or minimize the total platform energy consumption. When a mobile device such as mobile device 110 receives a file from an entity of the network 200 or core network 230, the mobile device 110 may identify the optimal compression configuration based on one or more of the compression related parameters or transmission related parameters described above, and request the base station 105, cloud server 240, or application server 235 to compress the data using the identified compression configuration. As described above, the mobile device 110 may identify the optimal compression configuration as the compression configuration that reduces or minimizes the total energy consumption for reception and decompression of the data on the mobile device 110.

Therefore, in embodiments, the total energy consumption of data delivery through a wireless interface may be minimized or at least reduced. Specifically, when a mobile device 110 wants to transmit a file (i.e., in an uplink scenario), it may be desirable to minimize or reduce the sum of compression energy plus transmission energy. On the other hand when a mobile device receives a file (i.e., in a downlink scenario), it may be desirable to minimize or reduce the sum of data reception energy plus the energy required for data compression. Additionally, further energy savings may be seen by transmitting or receiving the compressed data to or from the Internet or the cloud.

Figure 4:
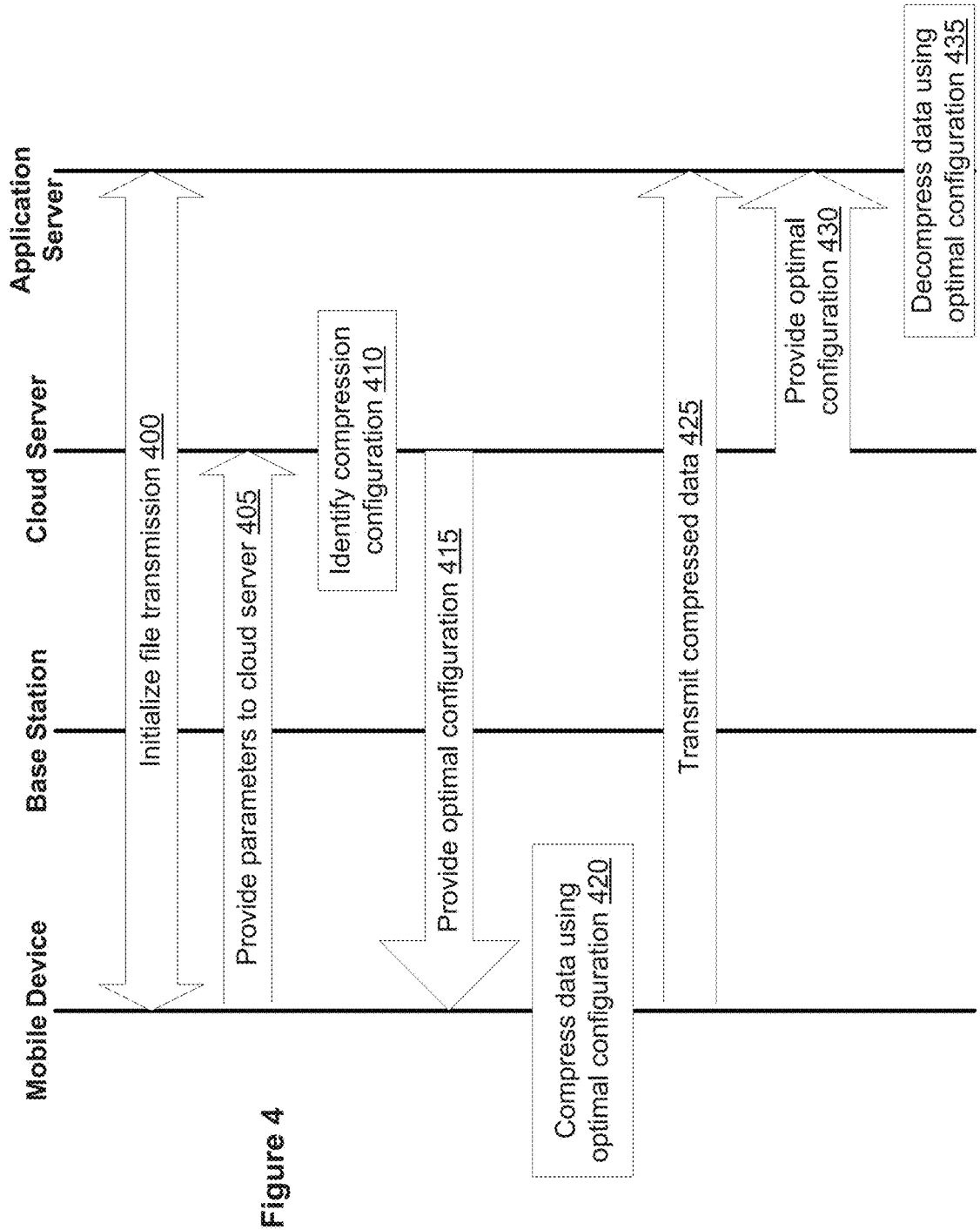
FIG. 4 depicts an example of uplink data compression and transmission, according to various embodiments.
Figure 5:
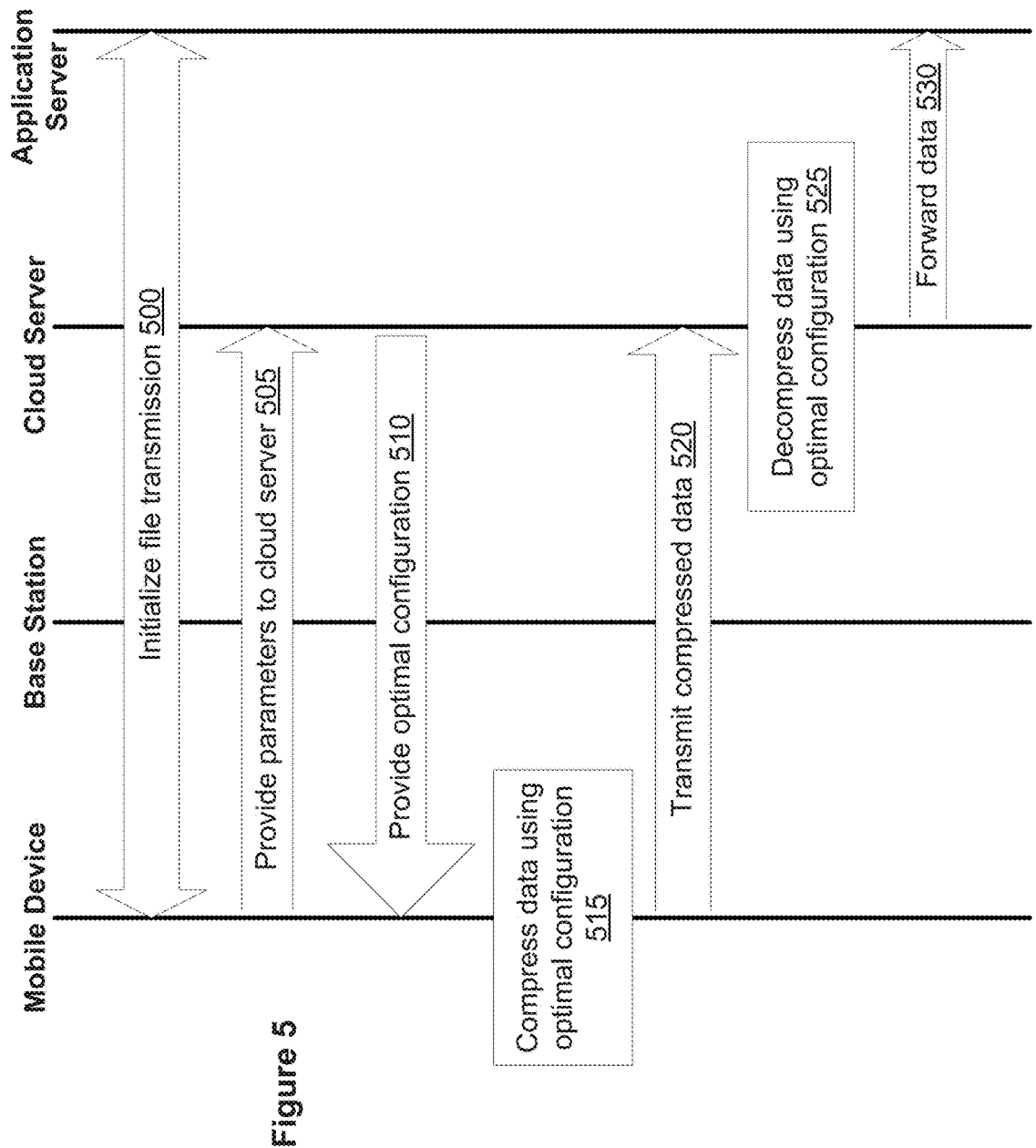
FIG. 5 depicts an alternative example of uplink data compression and transmission, according to various embodiments.

FIGS. 4 and 5 depict different examples of the system architecture for the uplink scenario. Specifically, a cloud server may be used to assist with file transmission, as described above. FIG. 4 depicts a direct scenario, while FIG. 5 depicts a forwarding scenario. In the direct scenario depicted in FIG. 4, a cloud server such as cloud server 240 may act to identify and transmit an indication of an optimal compression configuration in response to a request from a mobile device such as mobile device 110 or application server such as application server 235. After the data is compressed and transmitted, decompression may be performed by the application server. By contrast, in the forwarding scheme depicted in FIG. 5, a cloud server such as cloud server 240 may not only identify and provide an optimal compression configuration, but the cloud server may also receive, decompress, and forward a compressed file to an application server such as application server 235. Compared with the direct scheme, in the forwarding scheme the cloud server may have a higher loading, but there may be no need to change an application server to receive a compressed file, identify the compression configuration used to compress the file, and decompress the received data. In other words, the compression/decompression may be transparent to the application server.

Specifically, in the direct scheme, before a mobile device such as mobile device 110 transmits the file to an application server such as application server 240, the mobile device may first forward the required parameters and user preferences to a cloud server such as cloud server 235. The mobile device may then request an indication of an optimal compression configuration based on the forwarded parameters and/or user preferences from the cloud server. After receiving the compression configuration, the mobile device may then compress the file according to the suggested compression configuration, and send the compressed data to the application server. Upon receiving the compressed file, the application server may then decompress the file.

FIG. 4 depicts an example of the direct uplink forwarding scheme. The scheme may be performed by a mobile device such as mobile device 110, a base station such as base station 105, a cloud server such as cloud server 240, and an application server such as application server 235. Initially, the mobile device may initialize a file transmission to an application server at 400. After the file transmission has been initialized at 400, the mobile device and/or the base station may provide one or more parameters to the cloud server at 405. For example, the parameters may include one or more of: the compression related parameters, transmission related parameters, and/or an indication of user preferences as described above.

Based on the received parameters, the cloud server may identify an optimal compression configuration at 410, and provide an indication of the optimal compression configuration to the mobile device at 415. In some embodiments, the indication may include a lookup value for a table stored by the mobile device, one or more parameters of the compression configuration such as compression level or compression utility, or one or more other parameters.

After receiving the indication of the optimal compression configuration at 415, the mobile device may compress the data using the received compression configuration at 420. The mobile device may then transmit the compressed data to the application server at 425. Concurrently with, prior to, or subsequent to the transmission of the compressed data at 425 from the mobile station to the application server, the cloud server may additionally provide an indication of the optimal compression configuration to the application server at 430. For example, in some embodiments the cloud server may provide the indication of the optimal configuration to the application server in parallel with providing the indication to the mobile device at 415. In other embodiments, the cloud server may provide the indication of the optimal configuration to the application server concurrently with the transmission of the compressed data from the mobile device at 425. Upon receiving the transmitted compressed data at 425, the application server may decompress the received data using the optimal compression configuration at 435.

As described above, one or more of the communications between the mobile device and the cloud server or the application server may be routed through, or forwarded by, the base station. Additionally, as described above, a network such as network 200 may include a plurality of base stations, and one or more of the transmissions may be routed through a plurality of base stations.

By contrast, in the forwarding scheme, a mobile device such as mobile device 110 may transmit the compressed file to the cloud server after compressing the file according to the suggested optimal compression configuration. After receiving the compressed file, the cloud server may decompress the file and then forward the decompressed data to the application server.

Specifically, FIG. 5 depicts an example of an uplink forwarding scenario. Similar to the uplink direct scenario, the forwarding scenario may include a mobile device such as mobile device 110, a base station such as base station 105, a cloud server such as cloud server 240, and an application server such as application server 235.

Initially, the mobile device may initialize a file transmission to an application server at 500. After the file transmission has been initialized at 500, the mobile device and/or the base station may provide one or more parameters to the cloud server at 505. For example, the parameters may include one or more of: the compression related parameters, transmission related parameters, and/or an indication of user preferences as described above.

Based on the received parameters, the cloud server may identify an optimal compression configuration, and provide an indication of the optimal compression configuration to the mobile device at 510. In some embodiments, the indication may include a lookup value for a table stored by the mobile device, one or more parameters of the compression configuration such as compression level or compression utility, or one or more other parameters.

After receiving the indication of the optimal compression configuration at 510, the mobile device may compress the data using the received compression configuration at 515. The mobile device may then transmit the compressed data to the cloud server at 520.

The cloud server, upon reception of the compressed data, may decompress the data using the identified optimal compression configuration at 525. The cloud server may then forward the decompressed data to the application server at 530.

As described above, one or more of the communications between the mobile device and the cloud server or the application server may be routed through, or forwarded by, the base station. Additionally, as described above, a network such as network 200 may include a plurality of base stations, and one or more of the communications or transmissions may be routed through a plurality of base stations.

Figure 6:
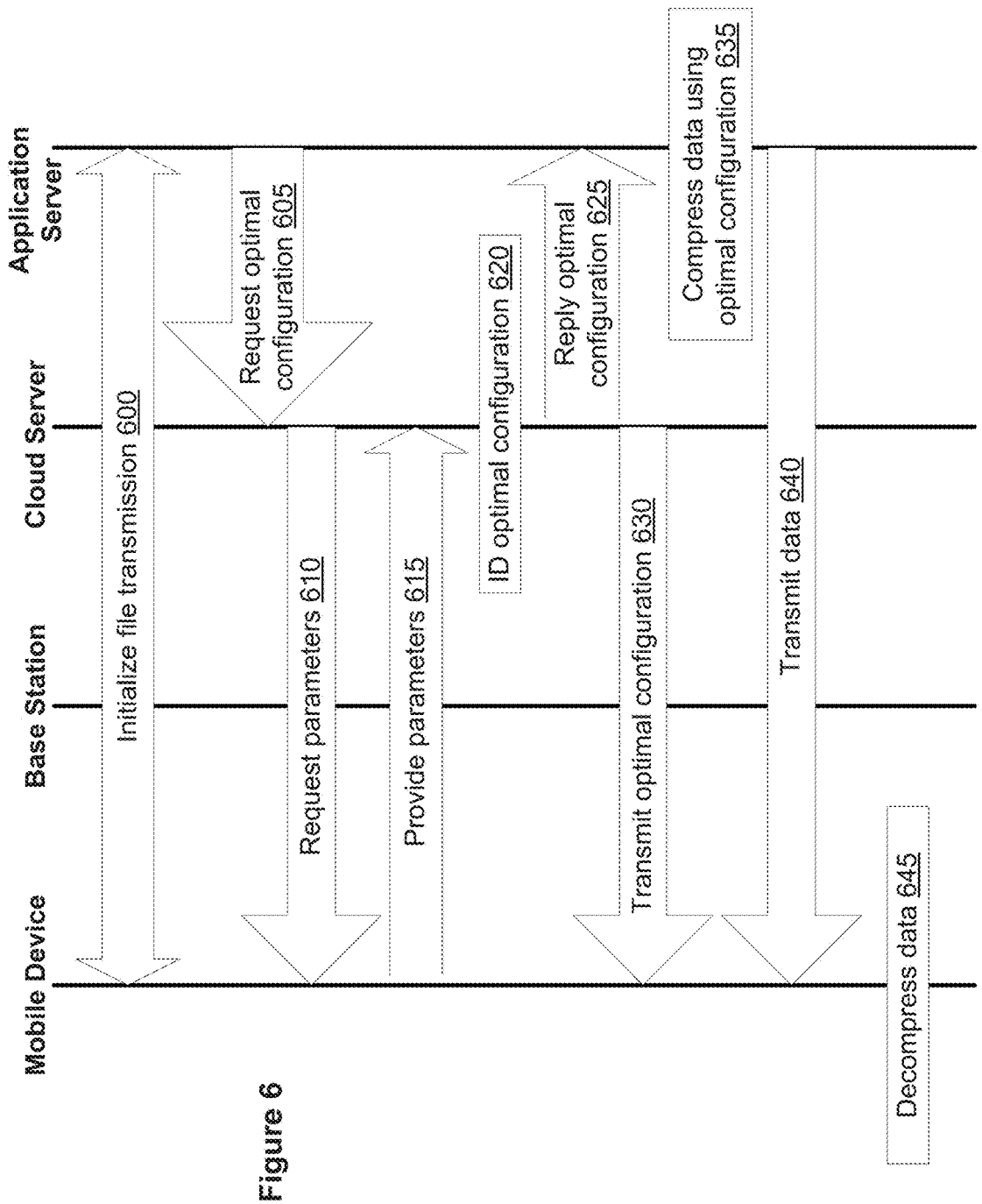
FIG. 6 depicts an example of downlink data compression and transmission, according to various embodiments.
Figure 7:
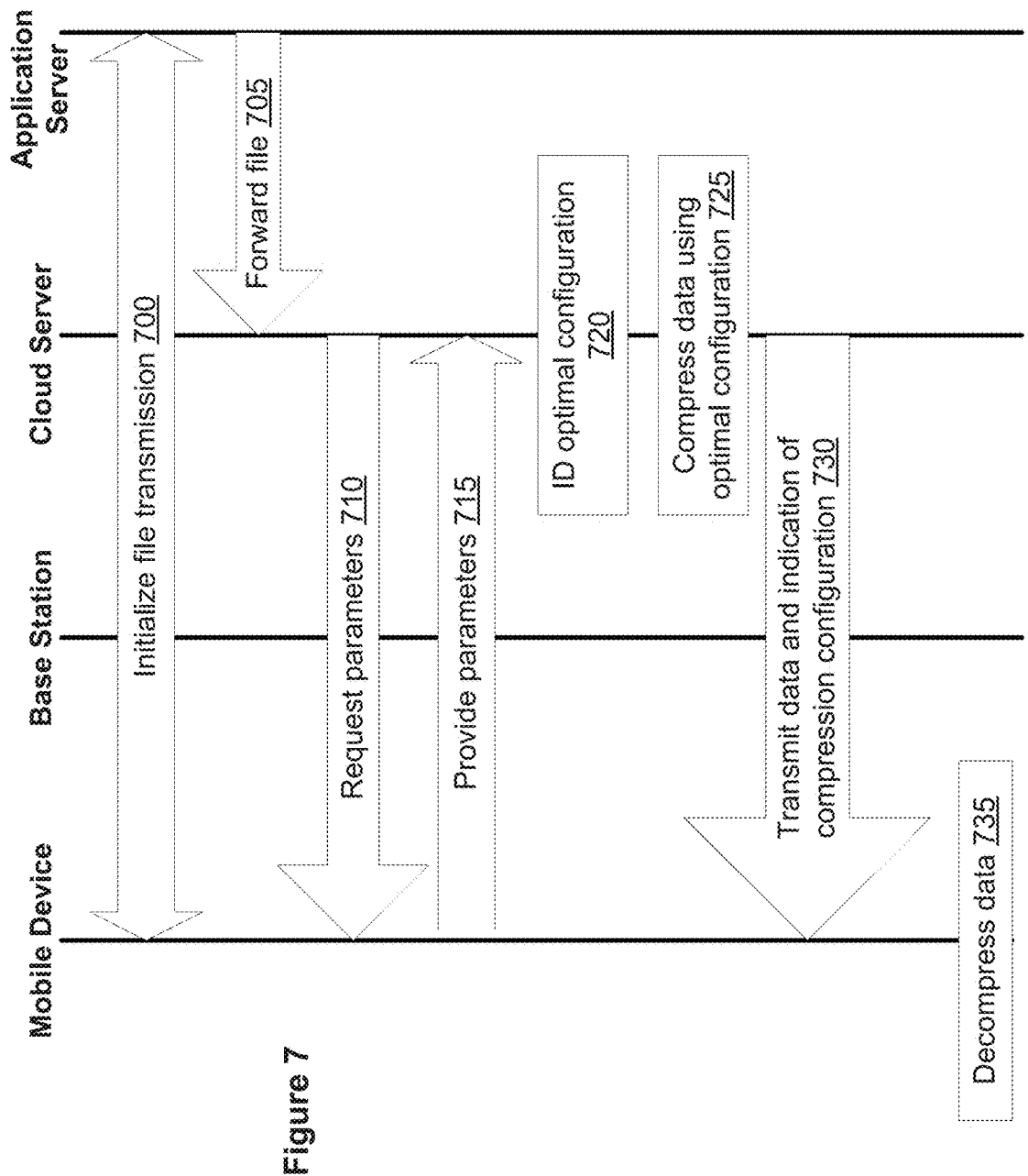
FIG. 7 depicts an alternative example of downlink data compression and transmission, according to various embodiments.

As noted above, compression of data may additionally be useful in the downlink scenario. FIGS. 6 and 7 depict different examples of the system architecture for the downlink scenario. Specifically, a cloud server may be used to assist with file transmission, similarly to the uplink scenarios described above. FIG. 6 depicts the example of a direct downlink scenario, while FIG. 7 depicts an example of the forwarding downlink scenario. In the direct scenario depicted in FIG. 6, the cloud server may identify the optimal compression configuration, and then forward an indication of that compression configuration to the application server. The application server may then compress the data and transmit the compressed data to the mobile device. In contrast, and the forwarding scenario depicted in FIG. 7, the cloud server may not only identify the optimal compression configuration, but also compress the file and forward the compressed data to the mobile device. Compared with the direct scenario, in the forwarding scenario the cloud server may have a higher loading, but the compression of the data may be transparent to the application server.

In the direct downlink scenario, before the application server sends the file to the mobile device, the application server may first request an indication of the optimal compression configuration from the cloud server. After receiving the indication of the optimal compression configuration, the application server may compress the file according to the suggested compression configuration and transmit the compressed data to the mobile device. Upon receiving the compressed file, the mobile device may decompress the file.

Specifically, a downlink direct compression scenario is shown in FIG. 6. The downlink direct compression scenario may involve a mobile device such as mobile device 110, a base station such as base station 105, a cloud server such as cloud server 240, and an application server such as application server 235.

Initially, a mobile device and application server may initialize file transmission at 600. Next, the application server may request an indication of an optimal compression configuration from a cloud server at 605. The cloud server may request an indication of one or more parameters from the mobile device at 610. In response, the mobile device and/or the base station may provide an indication of one or more parameters at 615. For example, the parameters may include one or more of: the compression related parameters, transmission related parameters, and/or an indication of user preferences as described above.

Based on the parameters received at 615, the cloud server may identify an optimal compression configuration at 620. The cloud server may then provide an indication of the optimal compression configuration to the application server at 625. In addition, the cloud server may transmit an indication of the optimal compression configuration to the mobile device at 630.

Upon receiving the indication of the optimal compression configuration at 625, the application server may compress the data using the optimal compression configuration at 635. The application server may then transmit the data to the mobile device at 640. The mobile device may then decompress the data at 645 using the compression configuration received from the cloud server at 630.

As described above with respect to the uplink direct compression scenario in FIG. 4, the transmission of the indication of the compression configuration at 630 may be performed concurrently with, prior to, or subsequent to the transmission of the indication of the compression configuration to the application server at 625, or the transmission of the data at 640. Additionally, as described above, one or more of the communications between the mobile device and the cloud server or the application server may be routed through, or forwarded by, the base station. Additionally, as described above, a network such as network 200 may include a plurality of base stations, and one or more of the communications may be routed through a plurality of base stations.

In contrast to the downlink direct compression scenario in FIG. 6, the application server may first forward the file to the cloud server in the forwarding scenario depicted in FIG. 7. The cloud server may then identify the optimal compression configuration and transmit the compressed data to the mobile device. Specifically, a downlink forwarding compression scenario is shown in FIG. 7. The downlink forwarding compression scenario may involve a mobile device such as mobile device 110, a base station such as base station 105, a cloud server such as cloud server 240, and an application server such as application server 235.

Initially, a mobile device and application server may initialize file transmission at 700. Next, the application server may forward the file to the cloud server at 705. Upon receipt of the file, the cloud server may request an indication of one or more parameters at 710. In response to the request, the mobile device and/or the base station may provide an indication of the parameters to the cloud server at 715. For example, the parameters may include one or more of: the compression related parameters, transmission related parameters, and/or an indication of user preferences as described above.

Based on the parameters received at 715, the cloud server may identify an optimal compression configuration at 720. The cloud server may then compress the data received from the application server at 705 using the identified compression configuration at 725. Next, the cloud server may transmit the compressed data and an indication of the compression configuration to the mobile devices at 730. The mobile device may then decompress the received data using the identified compression configuration at 735. As described above, in some embodiments the transmission of the data from the cloud server to the mobile device may be separate from the transmission of the indication of the compression configuration. For example, the transmission of the indication of the compression configuration may be performed prior to, or subsequent to, the transmission of the data.

Figure 8:
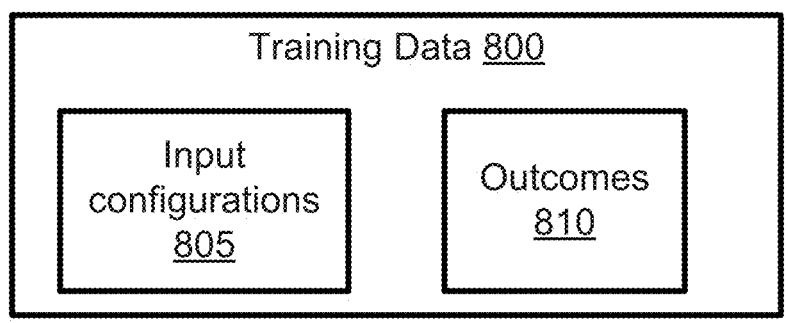
FIG. 8 depicts an example of training data, according to various embodiments.

In the embodiments described in FIGS. 4 through 7, the cloud server may receive one or more parameters from a mobile device and/or base station, and identify an optimal compression configuration. In embodiments, the optimal compression configuration for compression and/or decompression may be identified by a smart engine in the cloud server using a training algorithm. In some embodiments, a basic data set may be provided to the smart engine, and the engine may apply a self-learning algorithm such as machine learning to predict the possible energy consumption for one or more compression configurations. Based on the predicted energy consumption for the compression configurations, the engine may then identify the optimal compression configuration for a given data. In embodiments, the smart engine may also be configured to update or extend the data sets used by the smart engine according to the feedback of the decision outcome. FIG. 8 depicts an example of training data that may be used by the smart engine to identify a compression configuration.

Specifically, training data 800 may be input to the machine learning algorithm. The training data 800 may include one or more input configurations 805, and related compression configuration outcomes 810. Specifically, the outcomes 810 may be compression configuration outcomes based on one or more experiments performed using the input configurations 805 as seed values.

In general, it may be desirable for the input configurations 805 to include parameters that may affect the outcome of file transmission or reception. For example, the input configurations 805 may include parameters related to total time or energy consumption for file compression/decompression or transmission/reception. Similarly, it may be desirable for the outcomes 810 to include data related to realistic energy or time consumption of file compression/decompression or transmission/reception using the input configurations 805. For example, the input configurations 805 may include one or more of the transmission related parameters or the compression related parameters described above such as available bandwidth, file type, file size to be transmitted or received, link conditions of the transmission link, or other parameters. The outcomes 810 may include one or more elements of a compression configuration such as a configuration for the compression utility, a compression level, a CPU frequency that can optimize the file transmission reception, or other parameters.

Given the training data 800, it may now be possible to train a machine learning model using the training data 800 for a selected machine learning algorithm. For example, if it is desired to predict the energy consumption of a selected compression configuration under a set of known input parameters, it may be possible to use a "random forest algorithm" or some other machine learning algorithm to learn from an input trace performed during an experiment using the selected compression configuration. After training, it may then be possible to input some or all of the testing data back into the model to examine the correctness of the machine learning model. For example, if there is a large difference between the machine learning predicted outcome and the result of the experiment, then it may be possible to apply the testing data and the differences of feedback input to tune the machine learning model.

Figure 9:
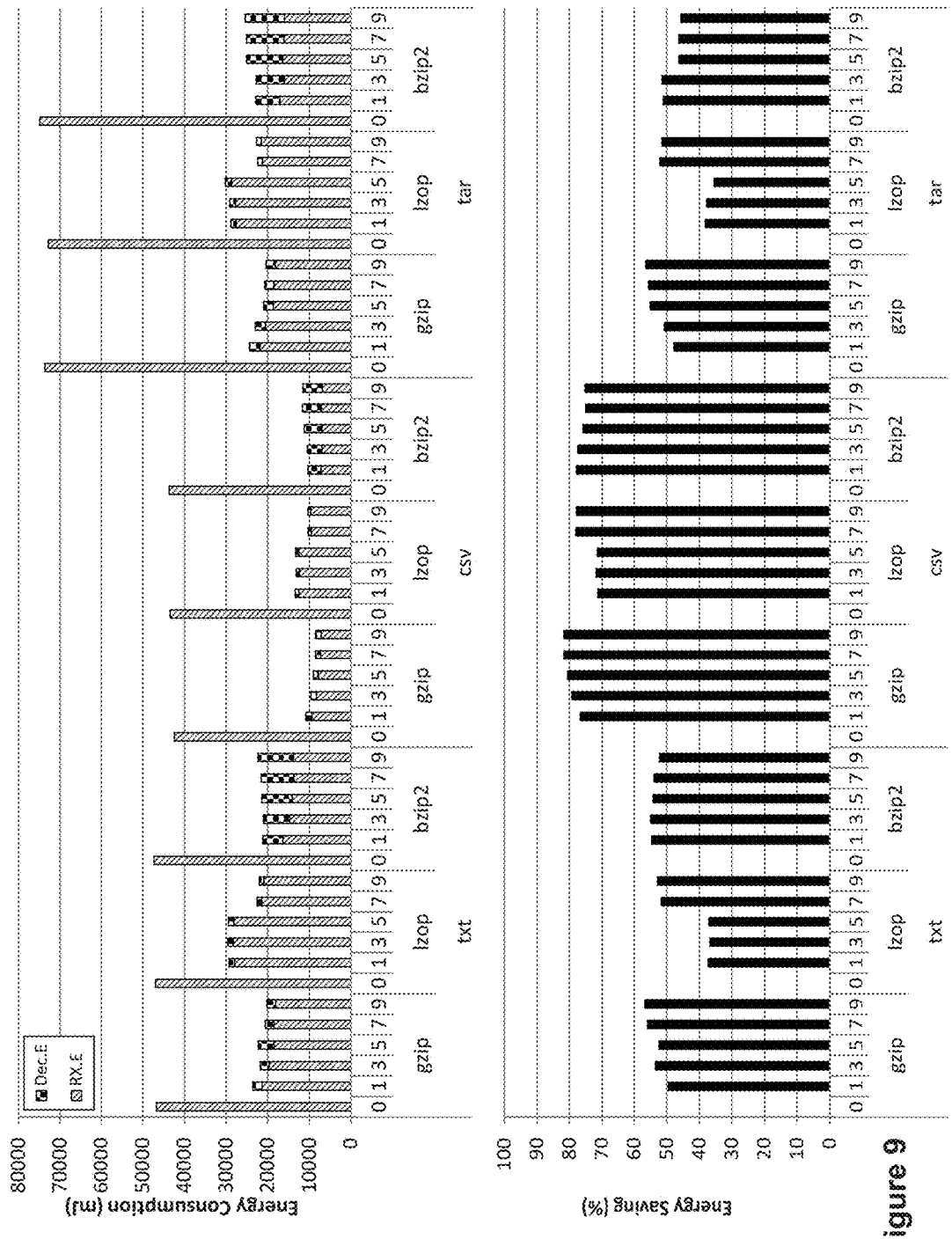
FIG. 9 depicts examples of energy consumption and energy savings using the various compression configurations for transmission of downlink data, according to various embodiments.

FIG. 9 depicts an example of test data depicting an energy-saving ratio for compression in a downlink scenario for a network such as network 200 with a wireless throughput limit of less than 5 megabits per second (Mbps). Specifically, FIG. 9 depicts an example of energy consumption or energy savings for different compressed files that are received by a mobile device such as mobile device 110 using different compression algorithms with different compression levels. Energy consumption is depicted in millijoules (mJ). Specifically, platform energy consumed for file reception is denoted asRx.E, and energy consumption for file decompression is denoted as Dec.E. Different compression levels are shown for three different file types, TXT files, CSV files, and TAR files. For each of the file types, different compression algorithms such as GZIP, LZOP, and BZIP2 are depicted. For each compression algorithm, results are depicted using compression levels 0, 1, 3, 5, 7, and 9. Additionally, energy savings are depicted in percentage for each file type, compression algorithm, and compression level. It can be seen that compression may reduce the total platform energy up to 81% compared to the scenario without compression (i.e., compression level 0), particularly for CSV files.

Figure 10:
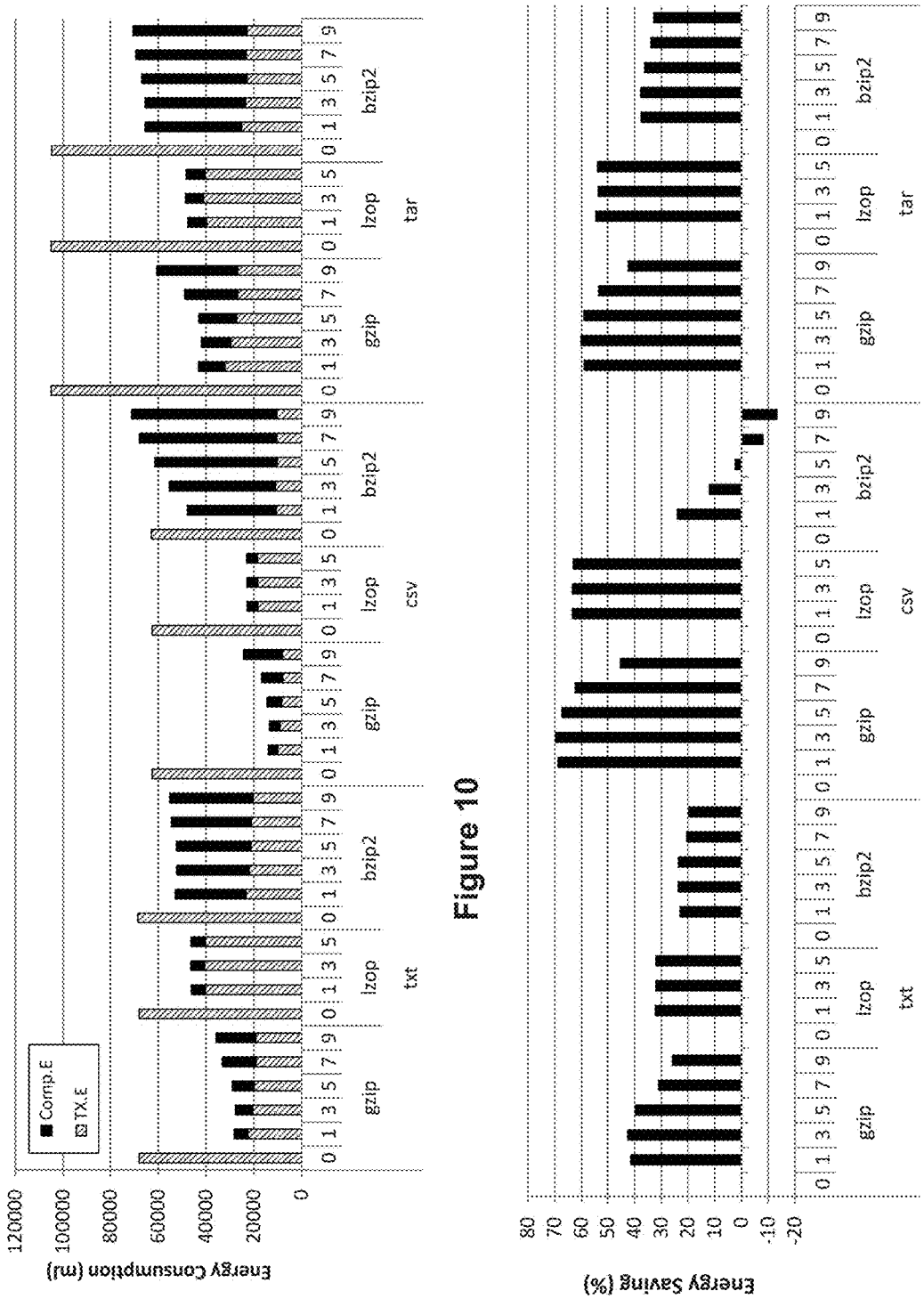
FIG. 10 depicts examples of energy consumption and energy savings using the various compression configurations for transmission of uplink data, according to various embodiments.

Similarly, FIG. 10 depicts an example of test data depicting an energy-saving ratio for compression in an uplink scenario for a network such as network 200 with a wireless throughput limit of less than 5 Mbps. Specifically, FIG. 10 depicts an example of energy consumption or energy savings for different files that are compressed and transmitted by a mobile device such as mobile device 110 using different compression algorithms with different compression levels. Energy consumption is depicted in mJ, similarly to FIG. 9. Specifically, platform energy consumed for file transmission is denoted as Tx.E, and platform energy consumed for file compression is denoted as Comp.E. Similarly to FIG. 9, energy consumption and energy savings are depicted for a plurality of file types, compression algorithms, and compression levels. It can be seen from FIG. 10 that the total platform energy consumption may be reduced by up to 70%, and GZIP and LZOP may achieve higher gains on average. Moreover, it may be seen that the energy-saving benefit may vary for different data or file types.

Figure 11:
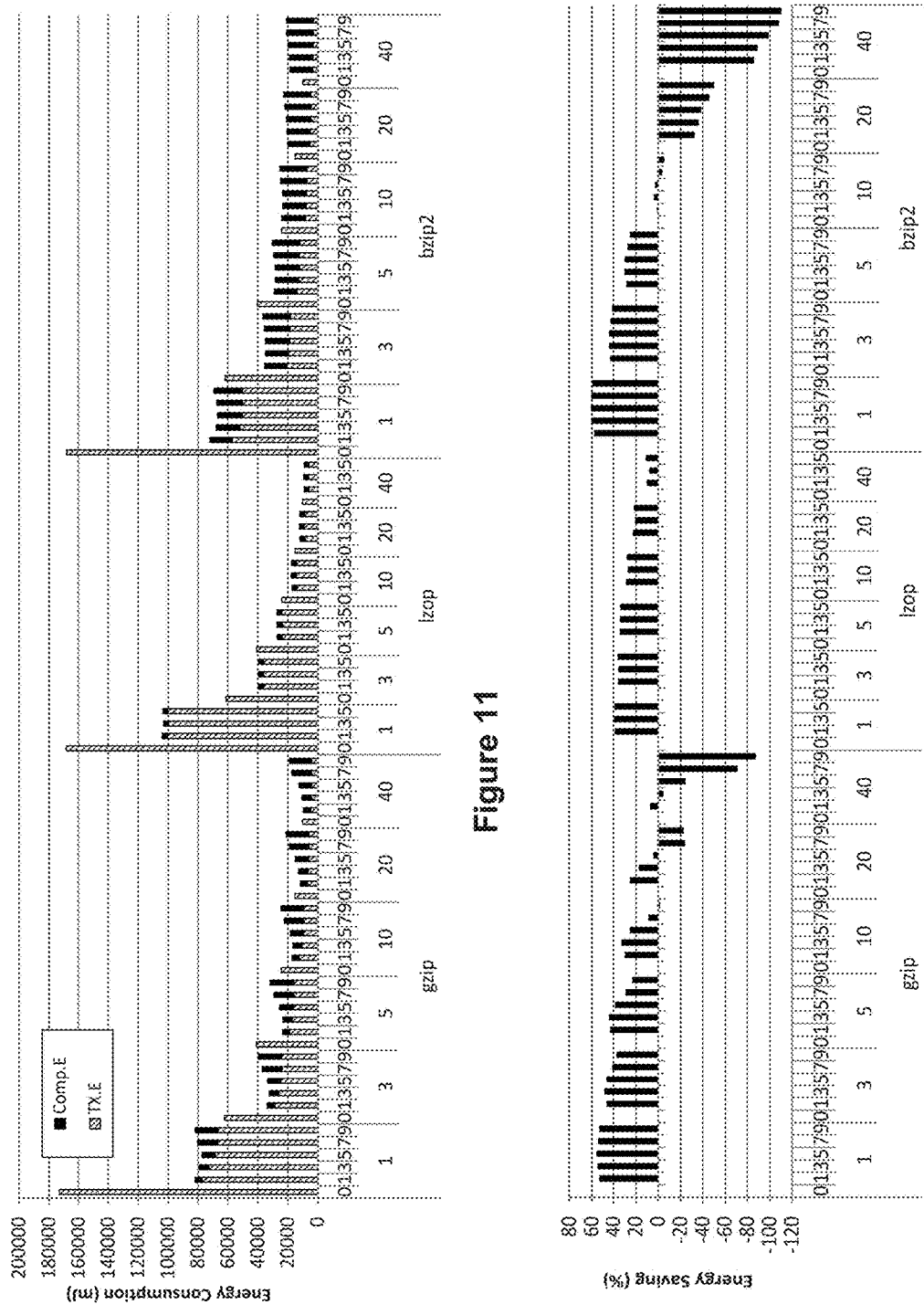
FIG. 11 depicts examples of energy consumption and energy savings using the various compression configurations for transmission of uplink data and bandwidth limited scenarios, according to various embodiments.

FIG. 11 depicts an example of test data depicting an energy-saving ratio for compression in an uplink scenario for a network such as network 200 with varying throughput limits. Specifically, FIG. 11 depicts energy consumption in mJ for different compression algorithms at different compression levels. Each of the compression algorithms and compression levels is depicted for networks having uplink throughputs of 1 Mbps, 3 Mbps, 5 Mbps, 10 Mbps, 20 Mbps, and 40 Mbps. FIG. 11 further depicts energy savings and percent for the uplink network for each of the different compression levels, compression algorithms, and uplink network throughput levels. It can be seen that when the available uplink bandwidth is limited (e.g., if the network has a slow Internet connection), then a larger benefit may be seen by compressing the file before transmitting the file. The reason for this benefit may be that when the available bandwidth is smaller, it may take longer for the mobile device to transmit the data. Therefore, the energy consumption for transmission by the mobile device may be significantly reduced by reducing the transmitted file size through increased compression.

From the observations above, it may be seen that the resulting energy consumption for different data types, compression utilities, and bandwidth limits may be significantly different. Additionally, compression may result in a higher energy gain for downlink scenarios as compared to uplink scenarios due to the fact that reception and decompression by a mobile device in a downlink scenario may be less burdensome than compression and transmission by a mobile device in an uplink scenario. However, it may be observed that energy savings for uplink scenarios may be additionally incurred, especially under bandwidth limited scenarios. Because there may be numerous different uplink and downlink scenarios (e.g., with different bandwidth limits, different data types, different data sizes, different CPU frequencies, etc.), it may be desirable to apply a machine learning algorithm as described above with respect to FIG. 8 to predict the possible outcomes of untested scenarios.

Figure 12:
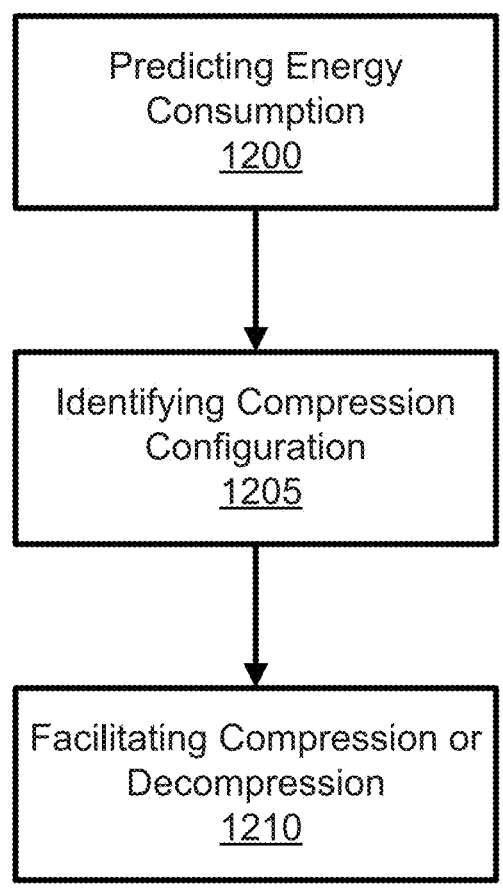
FIG. 12 depicts an example process for identifying and using a compression configuration, according to various embodiments.

FIG. 12 depicts a high-level example of a process that may be used by a cloud server such as cloud server 240, a mobile device such as mobile device 110, a base station such as base station 105, an application server such as application server 235, or a combination of two or more of the above. Specifically, one or more elements of the process may be performed by a compression configuration module 155 of a mobile device, a compression configuration module 175 of a base station, or a similar compression configuration module of an application server and/or a cloud server.

Initially, energy consumption may be predicted at 1200. Specifically, the energy consumption of one or more of file compression, file transmission, file reception, and/or file decompression may be predicted at 1200. This prediction may be based on a machine learning algorithm as described above, and the training data 800 described above in FIG. 8. This prediction may be performed by a cloud server based on a request from an application server, a base station, or a mobile device, or it may be initiated by a cloud server. In other embodiments, the prediction may be performed by the mobile device, the base station, or the application server.

Next, based on the predicted energy consumption, a compression configuration may be identified at 1205. This compression configuration may be considered an optimal compression configuration based on the input parameters provided by one or more of a mobile device and a base station. This identification may be performed by a cloud server, a base station, a mobile device, and/or an application server.

After the optimal compression configuration is identified at 1205, compression or decompression of the data may be facilitated at 1210. This facilitation may involve compressing or decompressing the data using the identified optimal compression configuration, or providing an indication of the compression configuration to a different network entity to perform the compression and decompression. For example, if the optimal compression configuration is identified by a cloud server at 1205, the cloud server may facilitate the compression or decompression at 1210 by providing an indication of the optimal compression configuration to an application server, a base station, or a mobile device.

Figure 13:
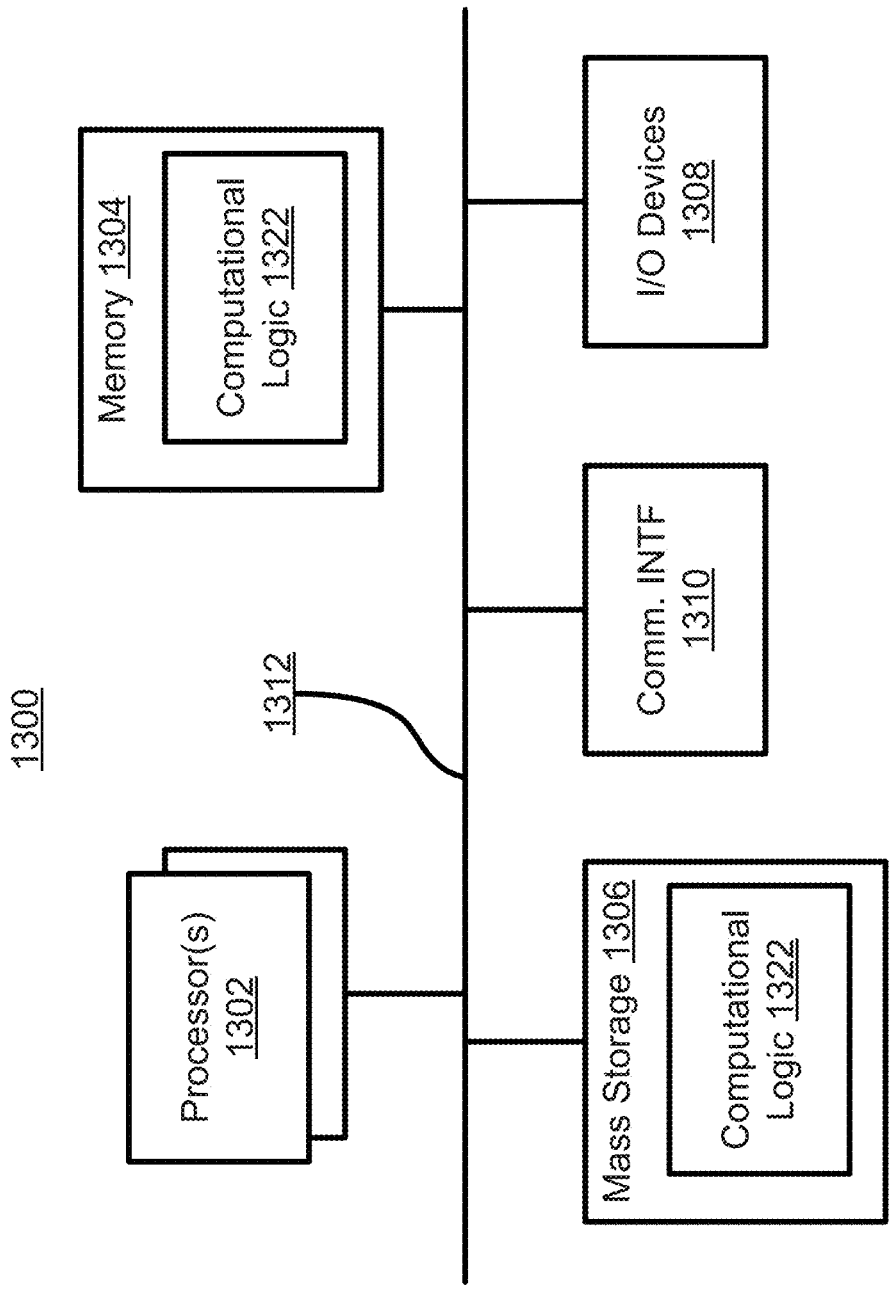
FIG. 13 illustrates an example computer system suitable for use to practice various aspects of the present disclosure, according to the disclosed embodiments.

FIG. 13 illustrates an example computer system that may be suitable for use as a client device or a server to practice selected aspects of the present disclosure. As shown, computer 1300 may include one or more processors or processor cores 1302, and system memory 1304. For the purpose of this application, including the claims, the terms "processor" and "processor cores" may be considered synonymous, unless the context clearly requires otherwise. Additionally, computer 1300 may include mass storage devices 1306 (such as diskette, hard drive, compact disc read-only memory (CD-ROM) and so forth), input/output (I/O) devices 1308 (such as display, keyboard, cursor control and so forth) and communication interfaces 1310 (such as network interface cards, modems and so forth). The elements may be coupled to each other via system bus 1312, which may represent one or more buses. In the case of multiple buses, they may be bridged by one or more bus bridges (not shown).

Each of these elements may perform its conventional functions known in the art. In particular, system memory 1304 and mass storage devices 1306 may be employed to store a working copy and a permanent copy of the programming instructions implementing the operations associated with compression configuration modules 155 or 175, earlier described, collectively referred to as computational logic 1322. The various elements may be implemented by assembler instructions supported by processor(s) 1302 or high-level languages, such as, for example, C, that can be compiled into such instructions.

The number, capability and/or capacity of these elements 1310-1312 may vary, depending on whether computer 1300 is used as a client device or a server. When used as a client device, the capability and/or capacity of these elements 1310-1312 may vary, depending on whether the client device is a stationary or mobile device, like a smartphone, computing tablet, ultrabook or laptop. Otherwise, the constitutions of elements 1310-1312 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entire software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 14 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1402 may include a number of programming instructions 1404. Programming instructions 1404 may be configured to enable a device, e.g., computer 1300, in response to execution of the programming instructions, to perform, e.g., various operations associated with compression configuration modules 155 or 175. In alternate embodiments, programming instructions 1404 may be disposed on multiple computer-readable non-transitory storage media 1402 instead. In alternate embodiments, programming instructions 1404 may be disposed on computer-readable transitory storage media 1402, such as signals.

Any combination of one or more computer-usable or computer-readable medium(s) may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency (RF), etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer-readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements that are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 13, for one embodiment, at least one of processors 1302 may be packaged together with memory having computational logic 1322 (in lieu of storing on memory 1304 and storage 1306). For one embodiment, at least one of processors 1302 may be packaged together with memory having computational logic 1322 to form a System in Package (SiP). For one embodiment, at least one of processors 1302 may be integrated on the same die with memory having computational logic 1322. For one embodiment, at least one of processors 1302 may be packaged together with memory having computational logic 1322 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may include an apparatus comprising: a communication module to transmit or receive data over a communication link; and a compression configuration module coupled with the communication module, the compression configuration module to: identify one or more compression/ decompression or transmission/reception parameters associated with transmission or reception of the data over the communication link; predict, based on the identified one or more compression/decompression or transmission/reception parameters, energy consumption of compression and transmission or reception and decompression of the data over the communication link, by the apparatus, for each of a plurality of compression configurations; and identify, based on the predicted energy consumption, a compression configuration from the plurality of compression configurations.

Example 2 may include the apparatus of example 1, wherein the compression configuration in the plurality of compression configurations includes an indication of a compression utility, an indication of a compression level, or an indication of a central processing unit (CPU) frequency.

Example 3 may include the apparatus of example 1, wherein the compression/decompression or transmission/reception parameters comprise transmission/reception parameters that include available bandwidth of the communication link, condition of the communication link or communication technology, and compression/decompression parameters that include compression applied, file type of the data, or file size of the data.

Example 4 may include the apparatus of any of examples 1-3, wherein the predicted energy consumption is based on a prediction of a time requirement for the compression and transmission of the data or decompression of the data.

Example 5 may include the apparatus of any of examples 1-3, wherein the data are data to be transmitted to an application server of a network, and wherein the communication module is to further: compress the data using the identified compression configuration; and then transmit the compressed data to the application server over the communication link.

Example 6 may include the apparatus of any of examples 1-3, wherein the data are data to be received from an application server of a network, and wherein the communication module is to further transmit an indication of the identified compression configuration to the application server to use to compress the data before sending the data to the apparatus over the communication link.

Example 7 may include one or more non-transitory computer-readable media comprising instructions that, when executed by one or more processors of a mobile device, cause the mobile device to: identify data to be transferred or received over a communication link; predict energy consumption of compression and transmission, or reception and decompression of the data over the communication link for each of a plurality of compression configurations; identify, based on the predicted energy consumption, a compression configuration; and compress and transmit, or receive and decompress the data using the identified compression configuration.

Example 8 may include the one or more computer-readable media of example 7, wherein the compression configuration in the plurality of compression configurations includes an indication of a compression utility, an indication of a compression level, or an indication of a central processing unit (CPU) frequency.

Example 9 may include the one or more computer-readable media of example 7, wherein the predicted energy consumption is based on available bandwidth of the communication link, condition of the communication link or communication technology, and compression/decompression parameters that include compression applied, file type of the data, or file size of the data.

Example 10 may include the one or more computer-readable media of any of examples 7-9, wherein the predicted energy consumption is based at least in part on a data model that includes information about previously transmitted data.

Example 11 may include the one or more computer-readable media of example 10, wherein the instructions further comprise instructions to update the data model based on feedback related to the transmitted or received compressed data.

Example 12 may include the one or more computer-readable media of any of examples 7-9, wherein the predicted energy consumption of compression and transmission or reception and decompression includes a prediction of a time requirement for the compression and transmission or reception and decompression.

Example 13 may include the one or more computer-readable media of any of examples 7-9, wherein the communication link is a wireless communication link.

Example 14 may include a method comprising: predicting, by a mobile device, for each of a plurality of compression configurations, energy consumption of compression and transmission, or reception and decompression of data over a communication link, wherein the data is to be compressed using a compression configuration of the plurality of compression configurations on the data; identifying, by the mobile device, based on the predicted energy consumption, the compression configuration to be used; and facilitating, by the mobile device, compression or decompression of the data using the identified compression configuration.

Example 15 may include the method of example 14, wherein a compression configuration in the plurality of compression configurations includes an indication of a compression utility, an indication of a compression level, or an indication of a central processing unit (CPU) frequency.

Example 16 may include the method of example 14, wherein the predicted energy consumption is based on available bandwidth of the communication link, condition of the communication link or communication technology, and compression/decompression parameters that include compression applied, file type of the data, or file size of the data.

Example 17 may include the method of any of examples 14-16, further comprising facilitating, by the mobile device, transmission or reception of the compressed data over the communication link.

Example 18 may include the method of any of examples 14-16, wherein the predicting is based at least in part on a data model that includes information about previously transmitted or received data.

Example 19 may include the method of any of examples 14-16, wherein predicting the energy consumption of compression and transmission, or reception and decompression includes predicting, by the mobile device, a time requirement for the compression and transmission, or reception and decompression.

Example 20 may include an apparatus comprising means to perform the method of any of examples 14-19.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A computer apparatus comprising:
a transceiver communication module comprising first computer program instructions to transmit or receive a compressed data over a communication link; and
a compression configuration module coupled with the transceiver communication module, the compression configuration module comprising second computer program instructions to:
identify one or more compression/decompression parameters, a length of time and energy of compression/decompression associated with compression of a data to form the compressed data or decompression of the compressed data to form the data, and a transmission/reception energy associated with transmission or reception of the compressed data over the communication link;
predict with a trained machine learning algorithm a predicted energy consumption based on an energy consumption trade-off among the identified one or more compression/decompression parameters, the length of time and energy of compression/decompression, and the transmission/reception energy, for each of a plurality of compression configurations;
identify, based on the predicted energy consumption, a compression configuration from the plurality of compression configurations;
obtain an energy and time outcome of the compression configuration; and
wherein a difference between the predicted energy consumption and the obtained energy and time outcome of the identified compression configuration is used to retrain the trained machine learning algorithm.

2. The apparatus of claim 1, wherein the compression configuration in the plurality of compression configurations includes an indication of a compression utility, an indication of a compression level, or an indication of a central processing unit (CPU) frequency and wherein the trained machine learning algorithm is a random forest algorithm.

3. The apparatus of claim 1, wherein the compression/decompression parameters comprise compression applied, file type of the data, and file size of the data.

4. The apparatus of claim 1, wherein the transmission/reception energy is based on a prediction of a time requirement for the transmission of the compressed data.

5. The apparatus of claim 1, wherein the data are data to be transmitted to an application server of a network, and wherein the transceiver communication module is to further:
compress the data to form the compressed data using the identified compression configuration; and
then transmit the compressed data to the application server over the communication link.

6. The apparatus of claim 1, wherein the compressed data are compressed data to be received from an application server of a network, and wherein the transceiver communication module is to further transmit an indication of the compression configuration to the application server to use to compress the data before sending the compressed data to the apparatus over the communication link.

7. One or more non-transitory computer-readable media comprising instructions that, when executed by one or more processors of a mobile device, cause the mobile device to:
identify a data to be transferred or received over a communication link;
predict with a trained machine learning algorithm a predicted energy consumption based on an energy consumption trade-off among a transmit/receive energy of a compressed data in the communication link and compression/decompression parameters that include an energy consumption of compression/decompression of the data/the compressed data for each of a plurality of compression configurations;
identify, based on the predicted energy consumption, a compression configuration;
compress the data and transmit the compressed data, or receive and decompress the compressed data using the identified compression configuration;
obtain an energy and time outcome of the identified compression configuration;
wherein a difference between the predicted energy consumption and the obtained energy and time outcome of the identified compression configuration is used to retrain the trained machine learning algorithm.

8. The one or more computer-readable media of claim 7, wherein the compression configuration in the plurality of compression configurations includes an indication of a compression utility, an indication of a compression level, or an indication of a central processing unit (CPU) frequency.

9. The one or more computer-readable media of claim 7, wherein the predicted energy consumption is further based on available bandwidth of the communication link, condition of the communication link or communication technology, and wherein the compression/decompression parameters include compression applied, file type of the data, file size of the data, and a compression/decompression time.

10. The one or more computer-readable media of claim 7, wherein the trained machine learning algorithm is trained with information about a previous compression configuration for a previously transmitted data and a difference between a previously predicted energy consumption for the previously transmitted data and a previous energy and time outcome of the previous compression configuration.

11. The one or more computer-readable media of claim 10, wherein the trained machine learning algorithm is a random forest machine learning algorithm.

12. The one or more computer-readable media of claim 7, wherein the predicted energy consumption is based at least in part on a prediction of a time requirement for compression and transmission or reception and decompression.

13. The one or more computer-readable media of claim 7, wherein the communication link is a wireless communication link.

14. A method comprising:
predicting by a mobile device with a trained machine learning algorithm a predicted energy consumption wherein the predicted energy consumption is based on, for each of a plurality of compression configurations, an energy consumption trade-off among a time and energy required to compress a data into a compressed data or a time and energy to decompress the compressed data into the data, compression/decompression parameters, and an energy of transmission of the compressed data over a communication link or an energy of reception of the compressed data over the communication link, wherein the data is to be compressed to form the compressed data using a compression configuration of the plurality of compression configurations on the data;
identifying, by the mobile device, based on the predicted energy consumption, the compression configuration to be used to reduce energy consumption;

facilitating, by the mobile device, compression or decompression of the data using the identified compression configuration;

obtaining, by the mobile device, an energy and time outcome of the identified compression configuration;

wherein a difference between the predicted energy consumption and the energy and time outcome of the compression configuration is used to retrain the trained machine learning algorithm.

15. The method of claim 14, wherein a compression configuration in the plurality of compression configurations includes an indication of a compression utility, an indication of a compression level, or an indication of a central processing unit (CPU) frequency.

16. The method of claim 14, wherein the predicted energy consumption is further based on available bandwidth of the communication link, condition of the communication link or communication technology, and compression/decompression parameters that include compression applied, file type of the data, or file size of the data.

17. The method of claim 14, further comprising facilitating, by the mobile device, transmission or reception of the compressed data over the communication link.

18. The method of claim 14, wherein the trained machine learning algorithm is trained with information about a previous compression configuration for a previously transmitted or received data and a difference between a previously predicted energy consumption for the previously transmitted or received data and a previous energy and time outcome of the previous compression configuration.

19. The method of claim 14, wherein the energy of transmission of the compressed data or the energy of reception of the compressed data over the communication link comprises a time requirement for the transmission or reception of the compressed data.

20. The method of claim 14, wherein the trained machine learning algorithm is a random forest machine learning algorithm.

* * * * *